(12) United States Patent
Dong et al.

(10) Patent No.: US 12,726,137 B2
(45) Date of Patent: Sep. 1, 2026

(54) POWER CONVERTER, ENERGY STORAGE SYSTEM, AND CONTROL METHOD

(71) Applicant: Huawei Digital Power Technologies Co., Ltd., Shenzhen (CN)

(72) Inventors: Peng Dong, Shanghai (CN); Xinyu Yu, Shanghai (CN); Kai Xin, Shanghai (CN); Yunfeng Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 182 days.

(21) Appl. No.: 18/770,904

(22) Filed: Jul. 12, 2024

(65) Prior Publication Data

US 2025/0023489 A1 Jan. 16, 2025

(30) Foreign Application Priority Data

Jul. 12, 2023 (CN) ........................ 202310861865.6

(51) Int. Cl.
*H02M 7/487* (2007.01)
*H02M 1/42* (2007.01)
*H02M 7/483* (2007.01)
*H02M 7/797* (2006.01)

(52) U.S. Cl.
CPC ......... *H02M 7/487* (2013.01); *H02M 1/4233* (2013.01); *H02M 7/797* (2013.01)

(58) Field of Classification Search
CPC ........................... H02M 7/4833; H02M 7/487
See application file for complete search history.

(56) References Cited

U.S. PATENT DOCUMENTS

2018/0041109 A1* 2/2018 Xu .................... H02M 7/53871
2022/0144093 A1* 5/2022 Chen .................... B60W 20/20
2022/0330415 A1* 10/2022 Qiao ...................... H02M 1/08
(Continued)

FOREIGN PATENT DOCUMENTS

CN 119154640 A * 12/2024 ........... H02M 7/487
WO WO-2022083219 A1 * 4/2022 ........ H02M 3/33584

OTHER PUBLICATIONS

Li et al.,"Neutral Point Potential Control Based on Second Order Harmonic Current Injection of Hysteresis Controlled 3-Level AC/DC Converter", IEEE Applied Power Electronics Conference and Exposition (APEC), IEEE, XP34124689, Mar. 20, 2022, 8 pages.

*Primary Examiner* — Sisay G Tiku
(74) *Attorney, Agent, or Firm* — Maier & Maier, PLLC

(57) ABSTRACT

A power converter includes a power conversion circuit, a bus capacitor, and a controller. A direct current input end of the power conversion circuit is configured to connect to a direct current power supply through a direct current bus. An alternating current output end of the power conversion circuit is configured to connect to an alternating current power grid through a point of common coupling (PCC). The controller is configured to: in response to that a difference between a voltage across two ends of the positive bus capacitor and a voltage across two ends of the negative bus capacitor is greater than a specified threshold, control the power converter to inject a second harmonic current into the alternating current power grid, to reduce the difference between the voltage across the two ends of the positive bus capacitor and the voltage across the two ends of the negative bus capacitor.

20 Claims, 7 Drawing Sheets

(56) References Cited

U.S. PATENT DOCUMENTS

| | | | | |
|---|---|---|---|---|
| 2023/0116269 | A1* | 4/2023 | Wieser | G01R 31/2837 361/88 |
| 2023/0238895 | A1* | 7/2023 | Moon | H02M 7/487 363/40 |

* cited by examiner

POWER CONVERTER, ENERGY STORAGE SYSTEM, AND CONTROL METHOD

CROSS REFERENCE OF RELATED APPLICATIONS

This application claims priority to Chinese Patent Application No. 202310861865.6, filed on Jul. 12, 2023, the disclosure of which is hereby incorporated by reference in its entirety.

TECHNICAL FIELD

The embodiments relate to the field of power electronics technologies and to a power converter, an energy storage system, and a control method.

BACKGROUND

In various power converters, a power converter with a three-level topology has advantages of a low distortion rate of an output voltage, a low stress of a switching transistor, and high operation efficiency, and can be widely used in new energy power conversion scenarios. A positive bus capacitor and a negative bus capacitor that are connected in series exist on a direct current side of each of the power converter with the three-level topology and a power converter with a multi-level topology. A series connection point of the positive bus capacitor and the negative bus capacitor is a neutral point. The positive bus capacitor is connected between a positive bus and the neutral point, and the negative bus capacitor is connected between the neutral point and a negative bus. Due to factors such as inconsistent component characteristics of switching transistors in the power converter and a drive delay difference, a difference exists between a voltage across two ends of the positive bus capacitor and a voltage across two ends of the negative bus capacitor, resulting in a shift of a potential of the neutral point. In other words, a problem of potential imbalance of the neutral point is caused. This situation may cause the stress of the switching transistor in the power converter to be increased, an output voltage waveform to be distorted, and a component life and system reliability to be reduced. Therefore, proper control is needed to balance the potential of the neutral point of the power converter, and to ensure stable and reliable operation of the power converter. At present, there are some algorithms to implement potential balance of the neutral point of the power converter through software control, but these algorithms can hardly meet requirements of complex operating conditions, and cannot effectively resolve the problem of potential imbalance of the neutral point of the power converter.

SUMMARY

The embodiments provide a power converter, an energy storage system, and a control method, to resolve a problem of potential imbalance of a neutral point of the power converter.

According to a first aspect, the embodiments provide a power converter. The power converter includes a power conversion circuit, a bus capacitor, and a controller. A direct current input end of the power conversion circuit is configured to connect to a direct current power supply through a direct current bus. An alternating current output end of the power conversion circuit is configured to connect to an alternating current power grid through a point of common coupling (PCC). The bus capacitor is connected in parallel to two ends of the direct current bus. The direct current bus includes a positive direct current bus and a negative direct current bus. The bus capacitor includes a positive bus capacitor and a negative bus capacitor that are connected in series. A series connection point of the positive bus capacitor and the negative bus capacitor is a neutral point. The positive bus capacitor is connected in parallel between the positive direct current bus and the neutral point, and the negative bus capacitor is connected in parallel between the negative direct current bus and the neutral point. Herein, a circuit topology of the power converter may be a neutral point clamped (NPC) three-level topology, a T-type three-level topology, an active neutral point clamped (ANPC) three-level topology, or the like, and may be determined based on an actual application scenario. The controller may be configured to: in response to that a difference between a voltage across two ends of the positive bus capacitor and a voltage across two ends of the negative bus capacitor is greater than a specified threshold, control the power converter to inject a second harmonic current into the alternating current power grid, to reduce the difference between the voltage across the two ends of the positive bus capacitor and the voltage across the two ends of the negative bus capacitor. A frequency of the second harmonic current is twice a fundamental frequency of the alternating current power grid. An initial phase angle of the second harmonic current is within a preset interval. The preset interval includes $[-\pi/4, -\pi/2]$, $[\pi/4, \pi/2]$, $[-\pi/2, \pi/2]$, $[\phi, \pi/2]$, $[-\pi/2, \phi-\pi]$, and $[-\pi/2, \pi/2]$. $\phi$ is a power factor of the power converter. The power factor is a phase difference between an output voltage and an output current of the power converter. Herein, the power factor may also be referred to as a power factor angle. Herein, that a difference between a voltage across two ends of the positive bus capacitor and a voltage across two ends of the negative bus capacitor is greater than a specified threshold indicates that a potential of the neutral point is unbalanced. The specified threshold may be determined based on an actual application scenario. In this way, when the initial phase angle of the second harmonic current is within the preset interval, the power converter is controlled to inject the second harmonic current with the specific initial phase angle into the alternating current power grid, so that the difference between the voltage across the two ends of the positive bus capacitor and the voltage across the two ends of the negative bus capacitor can be adjusted, to reduce the difference, and resolve a problem of potential imbalance of the neutral point.

In a possible implementation, the initial phase angle of the second harmonic current is in any interval of $[-\pi/4, -\pi/2]$, $[\pi/4, \pi/2]$, $[-\pi/2, \pi/2]$, $[\phi, \pi/2]$, $[-\pi/2, \phi-\pi]$, and $[-\pi/2, \pi/2]$ based on different modulation schemes and different power factors of the power converter. A value interval of the power factor includes $(0, \pi/2]$, $(\pi/2, \pi]$, and $[-\pi, 0]$. In other words, the initial phase angle is obtained based on the modulation scheme and the power factor of the power converter. In this way, no matter how the modulation scheme and the power factor change, the power converter may be controlled to inject a second harmonic current with a proper initial phase angle into the alternating current power grid, so that the difference between the voltage across the two ends of the positive bus capacitor and the voltage across the two ends of the negative bus capacitor can be adjusted, and the power converter may form negative feedback control when the power factor is in a range $[-\pi, \pi]$, to resolve the problem of potential imbalance of the neutral point.

In a possible implementation, when the modulation scheme of the power converter is discontinuous pulse width modulation (DPWM), the initial phase angle of the second harmonic current and the power factor of the power converter satisfy at least one of the following relationships:

when the power factor $\phi \in (0, \pi/2]$, the initial phase angle $\theta$ satisfies $\theta \in [-\pi/4, -\pi/2]$; or when the power factor $\phi \in (\pi/2, \pi]$, the initial phase angle $\theta$ satisfies $\theta \in [\pi/4, \pi/2]$; or when the power factor $\phi \in [-\pi, 0]$, the initial phase angle $\theta$ satisfies $\theta \in [-\pi/2, \pi/2]$.

Herein, the DPWM modulation scheme may include DPWM 0, DPWM 1, DPWM 2, and the like.

In this way, when the modulation scheme of the power converter is DPWM, the initial phase angle of the second harmonic current and the power factor are controlled to satisfy the specific relationship, and the power converter is controlled to inject the second harmonic current with the specific initial phase angle into the alternating current power grid, so that when the power factor changes randomly, the difference between the voltage across the two ends of the positive bus capacitor and the voltage across the two ends of the negative bus capacitor can be constantly adjusted based on the second harmonic current, and the power converter can form negative feedback control within all the power factor ranges, to resolve the problem of potential imbalance of the neutral point. In addition, the initial phase angle of the second harmonic current is adaptive to the change, and may be applicable to various power grid operating conditions such as a strong power grid and a weak power grid. The initial phase angle has strong applicability and good stability.

In a possible implementation, when the modulation scheme of the power converter is continuous pulse width modulation (CPWM), the initial phase angle of the second harmonic current and the power factor of the power converter satisfy at least one of the following relationships:

when the power factor $\phi \in (0, \pi/2]$, the initial phase angle $\theta$ satisfies $\theta \in [\phi, \pi/2]$; or when the power factor $\phi \in (\pi/2, \pi]$, the initial phase angle $\theta$ satisfies $\theta \in [-\pi/2, \phi-\pi]$; or when the power factor $\phi \in [-\pi, 0]$, the initial phase angle $\theta$ satisfies $\theta \in [-\pi/2, \pi/2]$.

Herein, the CPWM modulation scheme may include a sinusoidal pulse width modulation (SPWM), space vector pulse width modulation (SVPWM), and the like.

In this way, when the modulation scheme of the power converter is CPWM, the initial phase angle of the second harmonic current and the power factor are controlled to satisfy the specific relationship, and the power converter is controlled to inject the second harmonic current with the specific initial phase angle into the alternating current power grid, so that when the power factor changes randomly, the difference between the voltage across the two ends of the positive bus capacitor and the voltage across the two ends of the negative bus capacitor can be constantly adjusted based on the second harmonic current, and the power converter can form negative feedback control within all the power factor ranges, to resolve the problem of potential imbalance of the neutral point. In addition, the initial phase angle of the second harmonic current is adaptive to the change, and may be applicable to various power grid operating conditions such as a strong power grid and a weak power grid. The initial phase angle has strong applicability and good stability, and operation is simple.

In a possible implementation, the controller may be configured to control, based on a double frequency modulated voltage signal, a switching transistor in the power converter to be turned on or turned off, to control the power converter to inject the second harmonic current into the alternating current power grid. The double frequency modulated voltage signal is obtained by performing PI control on the second harmonic current. Herein, the controlling, based on a double frequency modulated voltage signal, a switching transistor in the power converter to be turned on or turned off can mean superposing an initial modulated signal and a target modulated voltage signal of the power converter to obtain a general modulated signal, and controlling, based on the general modulated signal, the switching transistor in the power converter to be turned on or turned off. The initial modulated signal of the power converter is also referred to as an original modulated wave, and is a modulated wave generated through control by the controller when control of potential balance of the neutral point is not performed. For example, when the modulation scheme is SPWM, the initial modulated signal is a sine wave signal.

In this way, the double frequency modulated voltage signal is generated, and the switching transistor of the power converter is controlled, based on the double frequency modulated voltage signal, to be turned on or turned off, so that the power converter can be controlled to inject the second harmonic current into the alternating current power grid, and the initial phase angle of the second harmonic current, the foregoing modulation scheme and the power factor satisfies a specific relationship, to reduce the difference between the voltage across the two ends of the positive bus capacitor and the voltage across the two ends of the negative bus capacitor, resolve the problem of potential imbalance of the neutral point, and improve reliability of the power converter.

In a possible implementation, the power factor of the power converter is an average value of a plurality of power factor instantaneous values. The plurality of power factor instantaneous values is obtained in a sampling periodicity. Each of the plurality of power factor instantaneous values is obtained based on a PCC voltage and the output current of the power converter. The sampling periodicity is less than half of a periodicity corresponding to the fundamental frequency of the alternating current power grid. In this way, the obtained power factor is representative, and may reflect an average situation of power factors in the sampling periodicity. Further, accuracy of obtaining the initial phase angle of the second harmonic current based on the power factor may be improved, to ensure effect of potential balance of the neutral point.

In a possible implementation, a current amplitude of the second harmonic current is obtained by performing proportional integral adjustment on a half-bus voltage difference, and the half-bus voltage difference is the difference between the voltage across the two ends of the positive bus capacitor and the voltage across the two ends of the negative bus capacitor. In this way, the power converter is subsequently controlled to inject the second harmonic current of the current amplitude, so that the difference between the voltage across the two ends of the positive bus capacitor and the voltage across the two ends of the negative bus capacitor can be adjusted, to resolve the problem of potential imbalance of the neutral point, and improve reliability and stability of the power converter.

According to a second aspect, the embodiments further provide an energy storage system. The energy storage system includes an energy storage battery and the power converter according to any one of the first aspect and the implementations of the first aspect. A direct current input end of the power converter is connected to the energy storage battery through a direct current bus. An alternating current output end of the power converter is connected to an alternating current power grid through a point of common coupling (PCC). When the energy storage battery is in a discharging state, the power converter is configured to: perform direct current-to-alternating current conversion based on a direct current provided by the energy storage battery and output a current obtained through direct current-to-alternating current conversion to the alternating current power grid. When a potential of a neutral point is shifted, the power converter in the energy storage system may be controlled to inject a second harmonic current with a proper initial phase angle into the alternating current power grid, to resolve a problem of potential imbalance of the neutral point and improve reliability of the energy storage system.

According to a third aspect, the embodiments further provide a control method. The method includes:

in response to that a difference between a voltage across two ends of a positive bus capacitor and a voltage across two ends of a negative bus capacitor is greater than a specified threshold, controlling a power converter to inject a second harmonic current into an alternating current power grid, to reduce the difference between the voltage across the two ends of the positive bus capacitor and the voltage across the two ends of the negative bus capacitor, where a frequency of the second harmonic current is twice a fundamental frequency of the alternating current power grid, an initial phase angle of the second harmonic current is within a preset interval, the preset interval includes $[-\pi/4, -\pi/2]$, $[\pi/4, \pi/2]$, $[-\pi/2, \pi/2]$, $[\phi, \pi/2]$, $[-\pi/2, \phi-\pi]$, and $[-\pi/2, \pi/2]$, $\phi$ is a power factor of the power converter, and the power factor is a phase difference between an output voltage and an output current of the power converter.

In a possible implementation, the initial phase angle of the second harmonic current is in any interval of $[-\pi/4, -\pi/2]$, $[\pi/4, \pi/2]$, $[-\pi/2, \pi/2]$, $[\phi, \pi/2]$, $[-\pi/2, \phi-\pi]$, and $[-\pi/2, \pi/2]$ based on different modulation schemes and different power factors of the power converter. A value interval of the power factor includes $(0, \pi/2]$, $(\pi/2, \pi]$, and $[-\pi, 0]$.

In a possible implementation, when the modulation scheme of the power converter is discontinuous pulse width modulation (DPWM), the initial phase angle and the power factor satisfy at least one of the following relationships:

when the power factor $\phi \in (0, \pi/2]$, the initial phase angle $\theta$ satisfies $\theta \in [-\pi/4, -\pi/2]$; or when the power factor $\phi \in (\pi/2, \pi]$, the initial phase angle $\theta$ satisfies $\theta \in [\pi/4, \pi/2]$; or when the power factor $\phi \in [-\pi, 0]$, the initial phase angle $\theta$ satisfies $\theta \in [-\pi/2, \pi/2]$.

In a possible implementation, when the modulation scheme of the power converter is continuous pulse width modulation (CPWM), the initial phase angle and the power factor satisfy at least one of the following relationships:

when the power factor $\phi \in (0, \pi/2]$, the initial phase angle $\theta$ satisfies $\theta \in [\phi, \pi/2]$; or when the power factor $\phi \in (\pi/2, \pi]$, the initial phase angle $\theta$ satisfies $\theta \in [-\pi/2, \phi-\pi]$; or when the power factor $\phi \in [-\pi, 0]$, the initial phase angle $\theta$ satisfies $\theta \in [-\pi/2, \pi/2]$.

In this way, the initial phase angle of the second harmonic current is determined based on the modulation scheme and the power factor of the power converter, and the power converter is controlled to inject, into the alternating current power grid, the second harmonic current whose the initial phase angle that satisfies a specific requirement. The injected second harmonic current can affect, through control, a shift of a neutral point when the power factor changes, so that the power converter can form negative feedback control within all the power factor ranges, to reduce the difference between the voltage across the two ends of the positive bus capacitor and the voltage across the two ends of the negative bus capacitor, and resolve a problem of potential imbalance of the neutral point. In addition, the control method can be applicable to a strong power grid operating condition and a weak power grid operating condition, can enable stable and reliable operation of the power converter in various power grid operating conditions, and can improve stability and reliability of the power converter. An application scope is wide, and operation is simple.

DETAILED DESCRIPTION OF EMBODIMENTS

Figure 1:
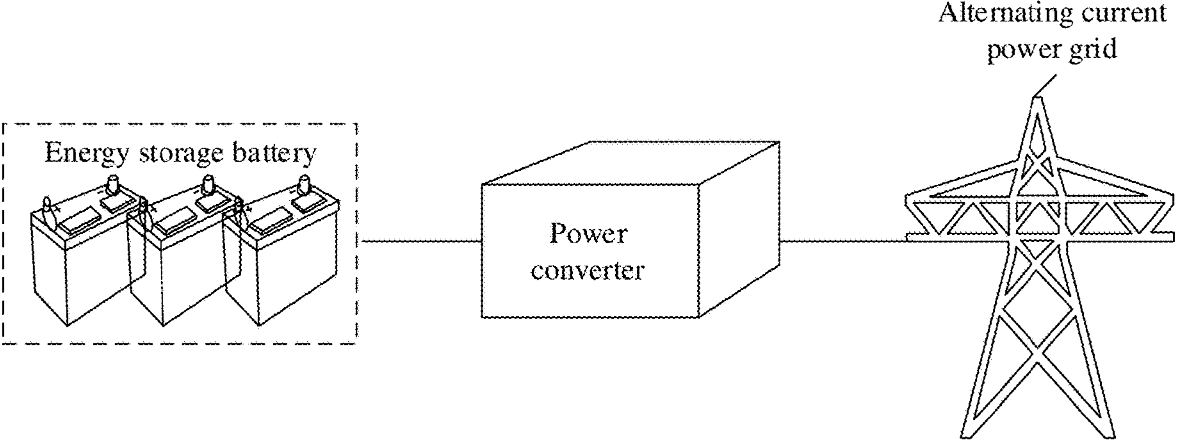
FIG. 1 is a diagram of an application scenario of a power converter.

FIG. 1 is a diagram of an application scenario of a power converter. The power converter may be used in different application scenarios, such as a photovoltaic power supply scenario, a hybrid photovoltaic-energy storage scenario, and an energy storage power supply scenario. In different scenarios, the power converter may operate in a grid-connected mode or a grid-disconnected mode, and is used in a plurality of types of electric power devices such as an inverter and an energy storage converter. As shown in FIG. 1, for example, the power converter is used in the energy storage power supply scenario and operates in the grid-connected mode. A direct current input end of the power converter may be configured to connect to a direct current power supply (in FIG. 1, for example, the direct current power supply includes an energy storage battery), and an alternating current output end of the power converter may be configured to connect to an alternating current power grid. In the application scenario shown in FIG. 1, the energy storage battery and the power converter form an energy storage system. The energy storage battery may provide a direct current for the power converter. When the energy storage battery is in a discharging state, the power converter may invert the direct current provided by the energy storage battery into an alternating current, and output the alternating current to the alternating current power grid, to supply power to a load in the alternating current power grid. It may be understood that the direct current power supply may further include a photovoltaic array and the like. This is not limited.

Figure 2:
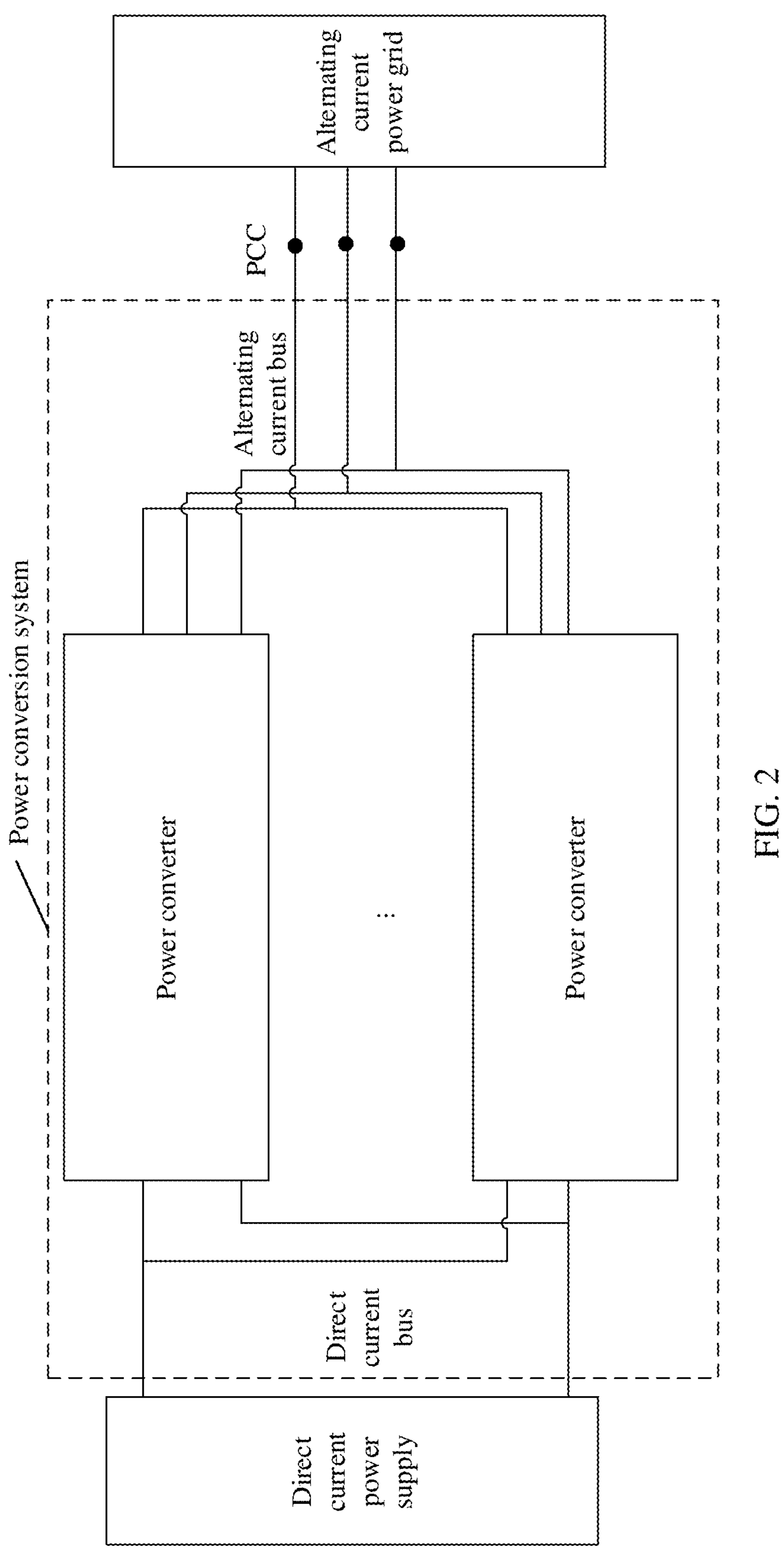
FIG. 2 is a diagram of a structure of a power conversion system.

FIG. 2 is a diagram of a structure of a power conversion system. The power conversion system may be applied to the application scenario shown in FIG. 1. The power conversion system may include one or more power converters. In FIG. 2, for example, the power conversion system includes N power converters (that is, a power converter 1, . . . , and a power converter N). N may be an integer greater than or equal to 2. As shown in FIG. 2, direct current input ends of the N power converters are connected in parallel to a direct current bus, and are connected to a direct current power supply through the direct current bus. Alternating current output ends of the N power converters are connected in parallel and then connected to an alternating current power grid through a point of common coupling (PCC), to implement modular parallel connection. The power converter provided in the embodiments may be used in the power conversion system.

The power converter is a multi-level converter, for example, a three-level converter, a five-level converter, or a seven-level converter, that may have a problem of potential imbalance of a neutral point. Herein, that potential imbalance of the neutral point occurs in the power converter, that is, a potential of the neutral point is shifted, means that a voltage across two ends of a positive bus capacitor is not equal to a voltage across two ends of a negative bus capacitor, and further means that a difference between the voltage across the two ends of the positive bus capacitor and the voltage across the two ends of the negative bus capacitor is greater than a specified threshold. Occurrence of potential imbalance of the neutral point may cause a stress of a switching transistor in the power converter to be increased, an output voltage waveform to be distorted, and a component life and system reliability to be reduced. Therefore, it is necessary to study control of potential balance of the neutral point of the power converter and find a proper control method to ensure stable operation of the power converter.

With reference to FIG. 3 to FIG. 7, an operating principle of the power converter provided in the embodiments is described below by using examples.

Figure 3:
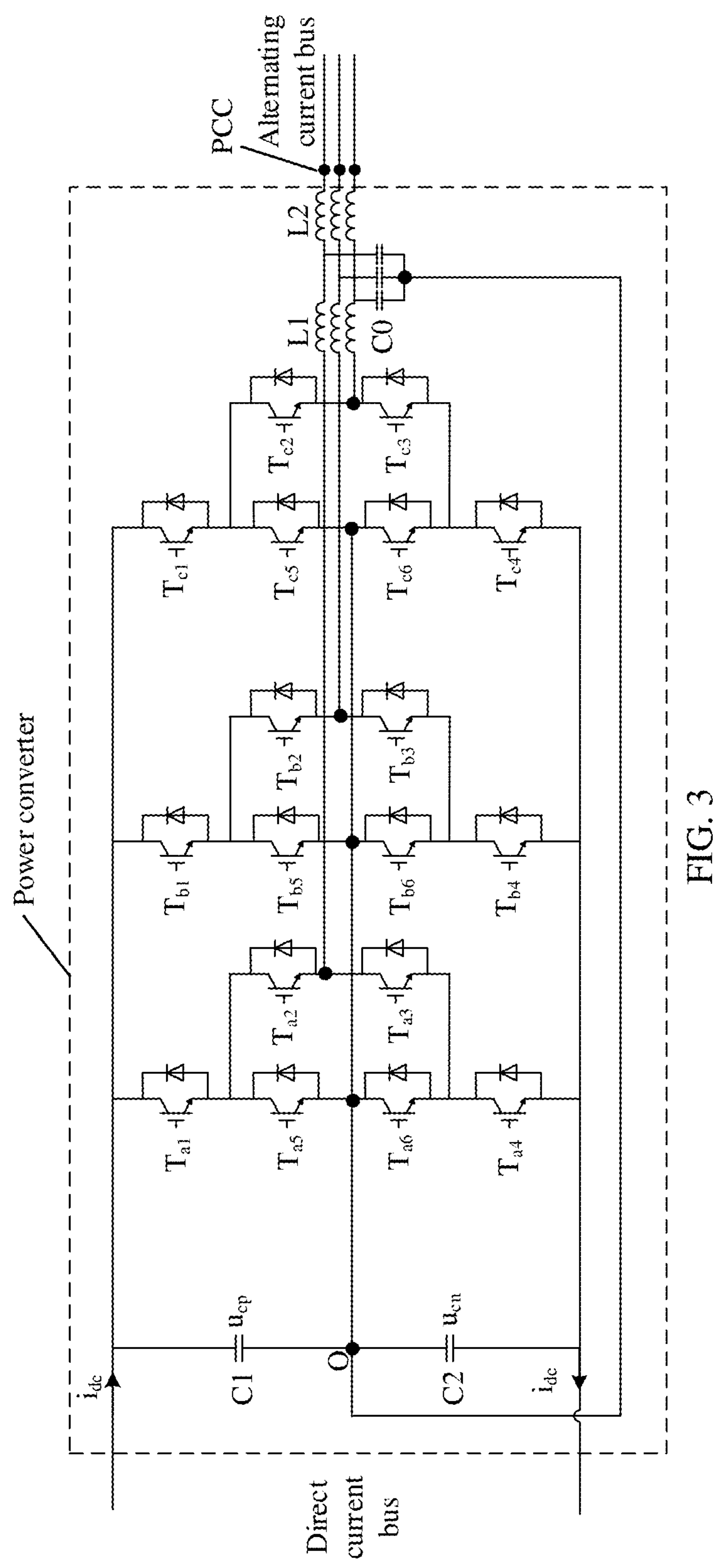
FIG. 3 is a schematic of a topology of a power converter according to the embodiments.

FIG. 3 is a schematic of a topology of a power converter according to the embodiments. In FIG. 3, for example, the topology of the power converter is an active neutral point clamped (ANPC) three-level circuit. It may be understood that the topology of the power converter may alternatively be a neutral point clamped (NPC) three-level circuit, a T-type three-level circuit, an ANPC five-level circuit, an NPC five-level circuit, a T-type five-level circuit, or the like. This is not limited. As shown in FIG. 3, the power converter includes a bus capacitor and a power conversion circuit. The bus capacitor is connected in parallel to a direct current input end of the power conversion circuit. The bus capacitor includes a positive bus capacitor and a negative bus capacitor that are connected in series. A connection point of the positive bus capacitor and the negative bus capacitor is a neutral point (point O in FIG. 3). The positive bus capacitor is connected between a positive direct current bus and the neutral point, and the negative bus capacitor is connected between a negative direct current bus and the neutral point. In FIG. 3, for example, the positive bus capacitor includes a capacitor C1, and the negative bus capacitor includes a capacitor C2. In this case, a capacitance value of C1 and a capacitance value of C2 are basically the same, and may be represented by C. In actual application, a quantity of positive bus capacitors and a quantity of negative bus capacitors may not be limited to one. This is not limited.

As shown in FIG. 3, the power converter is a three-phase power converter, and a power conversion circuit for each of three phases includes a plurality of switching transistors. For example, a phase a includes a switching transistor $T_{a1}$ to a switching transistor $T_{a6}$, a phase b includes a switching transistor $T_{b1}$ to a switching transistor $T_{b6}$, and a phase c includes a switching transistor $T_{c1}$ to a switching transistor $T_{c6}$. The phase a is used as an example. The switching transistor $T_{a1}$, a switching transistor $T_{a2}$, a switching transistor $T_{a3}$, and a switching transistor $T_{a4}$ are sequentially connected in series. A connection point of a second end of the switching transistor $T_{a2}$ and a first end of the switching transistor $T_{a3}$ is used as an output end of a power conversion circuit for the phase a. A switching transistor $T_{a5}$ and the switching transistor $T_{a6}$ are connected in series, and then connected in parallel to the switching transistor $T_{a2}$ and the switching transistor $T_{a3}$ that are connected in series. A series connection point of the switching transistor $T_{a5}$ and the switching transistor $T_{a6}$ is connected to the neutral point O. The switching transistor $T_{a1}$ to the switching transistor $T_{c6}$ may be insulated gate bipolar transistors (IGBTs), metallic oxide semiconductor field effect transistors (MOSFETs), thyristors, bipolar power transistors, wide band-gap semiconductor field effect transistors, or the like, and may be determined based on an actual application scenario. In FIG. 3, for example, the switching transistor $T_{a1}$ to the switching transistor $T_{c6}$ are IGBTs. In this case, the switching transistor $T_{a1}$ to the switching transistor $T_{c6}$ may be N-channel IGBTs. A first end of the switching transistor is a collector, and a second end of the switching transistor is an emitter.

As shown in FIG. 3, the power converter may further include an LCL filter. The LCL filter includes an inductor L1, a capacitor C0, and an inductor L2. The inductor L1 and the capacitor C0 are connected in series, and then connected between an output end of the power conversion circuit for each phase and the neutral point O. The inductor L2 may be connected between a PCC and a series connection point of the inductor L1 and the capacitor C0. The inductor L1, the capacitor C0, and the inductor L2 in the LCL filter operate together, so that ripples in an alternating current output by the power conversion circuit can be reduced, and a filtering function is implemented.

It may be understood that the power converter further includes a controller. The controller may obtain a pulse width modulated (PWM) signal based on various detected operating parameters (such as an output current and a PCC voltage of the power converter), to control the switching transistor in the power converter to be turned on or turned off, so that the power converter implements conversion of input electric energy.

In the power converter provided in the embodiments, in response to that a difference between a voltage across two ends of the positive bus capacitor and a voltage across two ends of the negative bus capacitor is greater than a specified threshold, the controller may control the power converter to inject a second harmonic current into an alternating current power grid, to reduce the difference between the voltage across the two ends of the positive bus capacitor and the voltage across the two ends of the negative bus capacitor. A frequency of the second harmonic current is twice a fundamental frequency of the alternating current power grid. An initial phase angle of the second harmonic current is within a preset interval. The preset interval includes $[-\pi/4, -\pi/2]$, $[\pi/4, \pi/2]$, $[-\pi/2, \pi/2]$, $[\phi, \pi/2]$, $[-\pi/2, \phi-\pi]$, and $[-\pi/2, \pi/2]$. $\phi$ is a power factor of the power converter. The power factor may also be referred to as a power factor angle. The power factor is a phase difference between an output voltage and the output current of the power converter. It may be understood that, when the difference between the voltage across the two ends of the positive bus capacitor and the voltage across the two ends of the negative bus capacitor is greater than the specified threshold, a potential of the neutral point of the power converter is shifted, a problem of potential imbalance of the neutral point occurs, and a specific measure needs to be taken to resolve the problem. Herein, the specified threshold may be determined based on an actual application scenario. The preset interval is obtained through theoretical analysis. The following describes an analysis process in detail. In the embodiments, when the initial phase angle of the second harmonic current is within the preset interval, the power converter is controlled to inject the second harmonic current with the specific initial phase angle into the alternating current power grid, so that the difference between the voltage across the two ends of the positive bus capacitor and the voltage across the two ends of the negative bus capacitor can be adjusted, to reduce the difference, resolve the problem of potential imbalance of the neutral point, and improve operating reliability and stability of the power converter.

In some possible implementations, the initial phase angle of the second harmonic current is in any interval of [−π/4, −π/2], [π/4, π/2], [−π/2, π/2], [ϕ, π/2], [−π/2, ϕ−π], and [−π/2, π/2] based on different modulation schemes and different power factors of the power converter. A value interval of the power factor includes (0, π/2], (π/2, π], and [−π, 0]. In other words, the initial phase angle is obtained based on the modulation scheme and the power factor of the power converter. When the modulation scheme is a specific modulation scheme and the power factor is within a specific value interval, the initial phase angle is within a specific interval in the preset interval. In this way, no matter how the modulation scheme and the power factor change, the power converter may be controlled to inject a second harmonic current with a proper initial phase angle into the alternating current power grid, so that the difference between the voltage across the two ends of the positive bus capacitor and the voltage across the two ends of the negative bus capacitor can be adjusted, to resolve the problem of potential imbalance of the neutral point.

In some possible implementations, that the initial phase angle of the second harmonic current is obtained based on the modulation scheme and the power factor of the power converter can mean that when the modulation scheme of the power converter is discontinuous pulse width modulation (DPWM), the initial phase angle of the second harmonic current and the power factor of the power converter satisfy at least one of the following relationships (1):

When the power factor $$\phi \in \left(0, \frac{\pi}{2}\right],$$

the initial phase angle of the second harmonic current θ satisfies $$\theta \in \left[-\frac{\pi}{4}, -\frac{\pi}{2}\right];$$

or when the power factor $$\phi \in \left(\frac{\pi}{2}, \pi\right],$$

the initial phase angle of the second harmonic current θ satisfies $$\theta \in \left[\frac{\pi}{4}, \frac{\pi}{2}\right];$$

or when the power factor $\phi \in [-\pi, 0]$, the initial phase angle of the second harmonic current θ satisfies $$\theta \in \left[-\frac{\pi}{2}, \frac{\pi}{2}\right].$$

Herein, the DPWM modulation means that in a switching periodicity, there is constantly one phase in a three-phase circuit with all switching transistors in an on state or off state, and switching transistors in the other two phases have switching actions. For example, the DPWM modulation scheme may include schemes of DPWM 0, DPWM 1, DPWM 2, and the like. This is not limited. The power factor is a phase difference between the output voltage and the output current of the power converter.

It may be understood that the correspondences (1) are calculated through theoretical deduction, and are described in detail subsequently.

In this embodiment, the second harmonic current whose initial phase angle is related to the modulation scheme and the power factor of the power converter is injected, so that when the modulation scheme and the power factor change randomly, the difference between the voltage across the two ends of the positive bus capacitor and the voltage across the two ends of the negative bus capacitor can be constantly adjusted based on the second harmonic current, to resolve the problem of potential imbalance of the neutral point. The initial phase angle of the second harmonic current in this algorithm is adaptive to the change, and may be applicable to various power grid operating conditions. The initial phase angle has strong applicability and good stability, and operation is simple.

In some possible implementations, that the initial phase angle of the second harmonic current is obtained based on the modulation scheme and the power factor of the power converter can mean that when the modulation scheme of the power converter is continuous pulse width modulation (CPWM), the initial phase angle of the second harmonic current and the power factor of the power converter satisfy at least one of the following relationships (2):

When the power factor $$\phi \in \left(0, \frac{\pi}{2}\right],$$

the initial phase angle of the second harmonic current θ satisfies $$\theta \in \left[\phi, \frac{\pi}{2}\right];$$

or when the power factor $$\phi \in \left(\frac{\pi}{2}, \pi\right],$$

the initial phase angle of the second harmonic current θ satisfies $$\theta \in \left[-\frac{\pi}{2}, \phi - \pi\right];$$

or when the power factor $\phi \in [-\pi, 0]$, the initial phase angle of the second harmonic current θ satisfies $$\theta \in \left[-\frac{\pi}{2}, \frac{\pi}{2}\right].$$

Herein, the CPWM modulation means that in a switching periodicity, the switching transistors in all the three phases in the circuit have on-off actions. For example, the CPWM modulation scheme may include a plurality of schemes such as sinusoidal pulse width modulation (SPWM) and space vector pulse width modulation (SVPWM). This is not limited.

It may be understood that the correspondences (2) are also calculated through theoretical deduction, and are described in detail subsequently.

In this embodiment, the second harmonic current whose initial phase angle is related to the modulation scheme and the power factor of the power converter is injected, so that when the modulation scheme and the power factor change randomly, the difference between the voltage across the two ends of the positive bus capacitor and the voltage across the two ends of the negative bus capacitor can be constantly adjusted based on the second harmonic current, to resolve the problem of potential imbalance of the neutral point. The initial phase angle of the second harmonic current in this algorithm is adaptive to the change, and may be applicable to various power grid operating conditions such as a strong power grid and a weak power grid. The initial phase angle has strong applicability and good stability, and operation is simple.

In some possible implementations, the controller may control, based on a double frequency modulated voltage signal, the switching transistor in the power converter to be turned on or turned off, to control the power converter to inject the second harmonic current into the alternating current power grid. The double frequency modulated voltage signal is obtained by performing proportional integral (PI) control on the second harmonic current. Herein, the controlling, based on a double frequency modulated voltage signal, the switching transistor in the power converter to be turned on or turned off can mean superposing an initial modulated signal and a target modulated voltage signal of the power converter to obtain a general modulated signal, and controlling, based on the general modulated signal, the switching transistor in the power converter to be turned on or turned off. The initial modulated signal of the power converter may also be referred to as an original modulated wave, and is a modulated wave output by the controller of the power converter when control of potential balance of the neutral point is not performed. The initial modulated signal also represents a reference signal used by the power converter in a modulation process when control of potential balance of the neutral point is not performed. Based on the initial modulated signal, a waveform output by the power converter may be controlled. For example, when the modulation scheme is SPWM, the initial modulated signal is a sine wave signal; or when the modulation scheme is SVPWM, the initial modulated signal is a sine wave signal obtained by superposing a third harmonic component. The double frequency modulated voltage signal is obtained by performing PI control (also referred to as current loop control herein) on the second harmonic current. Therefore, the double frequency modulated voltage signal is generated, and the switching transistor of the power converter is controlled, based on the double frequency modulated voltage signal, to be turned on or turned off, so that the power converter can be controlled to inject the second harmonic current into the alternating current power grid. Further, a characteristic parameter of the second harmonic current, such as the initial phase angle, is obtained by analyzing a process of potential balance of the neutral point. Therefore, the second harmonic current is injected, to reduce the difference between the voltage across the two ends of the positive bus capacitor and the voltage across the two ends of the negative bus capacitor, resolve the problem of potential imbalance of the neutral point, prolong a service life of the switching transistor, and improve reliability of the power converter.

In some possible implementations, the power factor of the power converter is an average value of a plurality of power factor instantaneous values. The plurality of power factor instantaneous values is obtained in a sampling periodicity. Each of the plurality of power factor instantaneous values is obtained based on the PCC voltage and the output current of the power converter. The power factor instantaneous value, the PCC voltage, and the output current of the power converter may be obtained through sampling at a same moment in the sampling periodicity. The sampling periodicity is less than half of a periodicity corresponding to the fundamental frequency of the alternating current power grid. In this way, the power factor obtained in a manner of averaging is representative, and may reflect an average situation of power factors in the sampling periodicity. The initial phase angle of the second harmonic current may be further obtained based on the power factor, and accuracy of the obtained initial phase angle of the second harmonic current can be improved, to improve effect of the algorithm for potential balance of the neutral point, and improve reliability and stability of the circuit.

In some possible implementations, another characteristic parameter, such as an amplitude, of the second harmonic current that needs to be injected may be further obtained based on the difference between the voltage across the two ends of the positive bus capacitor and the voltage across the two ends of the negative bus capacitor. For example, the controller in the power converter may obtain the current amplitude of the second harmonic current by performing proportional integral (PI) control on a half-bus voltage difference. The half-bus voltage difference is the difference between the voltage across the two ends of the positive bus capacitor and the voltage across the two ends of the negative bus capacitor. It can be understood from theoretical analysis that, the half-bus voltage difference and the current amplitude of the second harmonic current satisfy a specific mathematical relationship. Therefore, through the PI control, an amplitude that is of the second harmonic current and that exists when the half-bus voltage difference is equal to a reference value may be obtained, that is, a required current amplitude is obtained. In this way, the initial phase angle of the second harmonic current injected by the power converter into the alternating current power grid is controlled to be a specific value, and the current amplitude is also controlled to be a specific value. Therefore, after the second harmonic current is injected, the difference between the voltage across the two ends of the positive bus capacitor and the voltage across the two ends of the negative bus capacitor may be adjusted, to reduce the difference, so as to balance the potential of the neutral point, and improve reliability and stability of the power converter.

In some possible implementations, because the frequency of the second harmonic current is twice a PCC fundamental voltage frequency, the controller in the power converter may further obtain a PCC voltage frequency, and obtain the frequency of the second harmonic current based on the PCC voltage frequency. The PCC fundamental voltage frequency may be obtained by using a phase-locked loop (PLL). This is not limited. In this way, the frequency of the second harmonic current that needs to be injected may be obtained based on the PCC voltage, to obtain, through calculation, the second harmonic current that needs to be injected. This helps implement potential balance of the neutral point of the power converter, and improve reliability and stability of the power converter.

In some possible implementations, the second harmonic current is a negative-sequence current. It can be understood from theoretical analysis that, when the second harmonic current is a negative-sequence current, potential balance of the neutral point of the power converter can be ensured.

Figure 4:
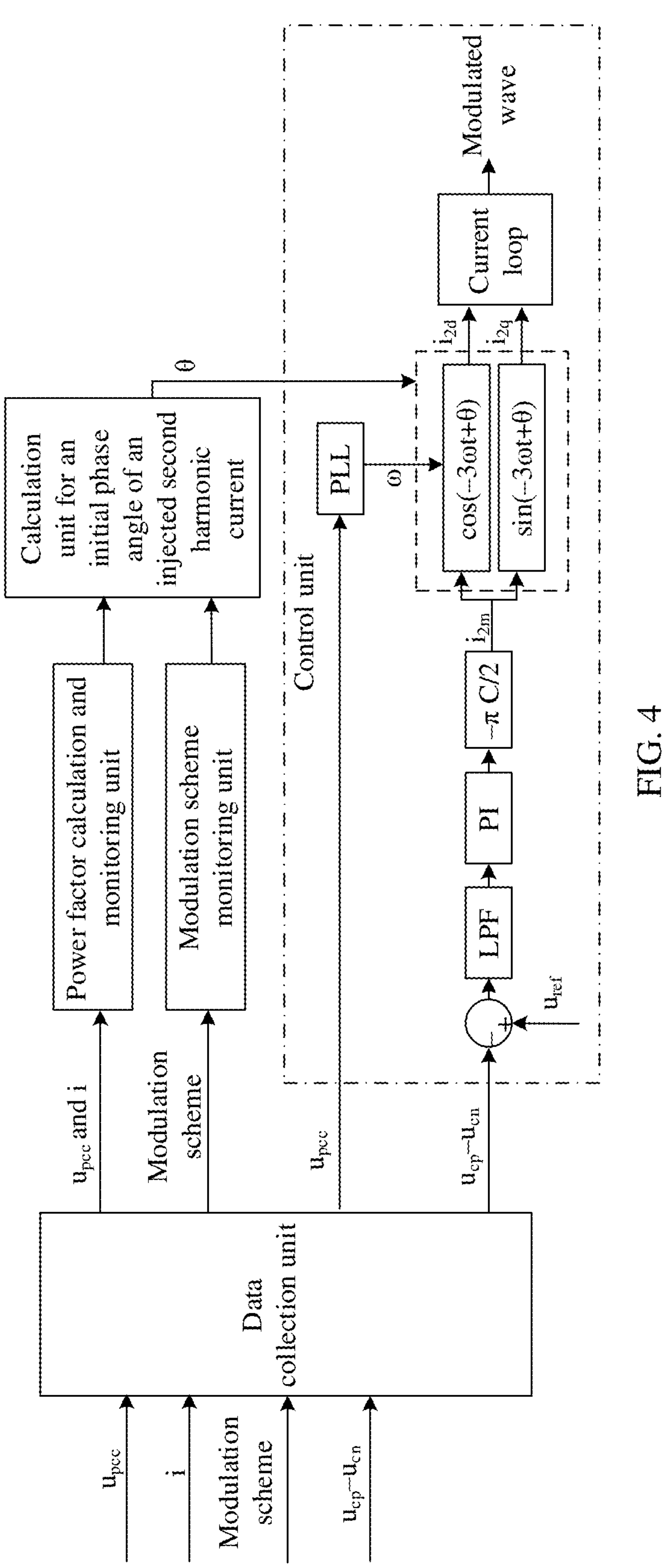
FIG. 4 is a block diagram of control of a controller in a power converter according to the embodiments.

FIG. 4 is a block diagram of control of a controller in a power converter according to the embodiments. As shown in FIG. 4, the controller in the power converter may include a data collection unit, a power factor calculation and monitoring unit, a modulation scheme monitoring unit, a calculation unit for an initial phase angle of an injected second harmonic current, and a control unit. For example, in each operating periodicity, the controller may obtain, by using the data collection unit, a PCC voltage up, an output current i of the power converter, a modulation scheme of the power converter, and a difference $u_{cp}-u_{cn}$ (that is, a half-bus voltage difference) between a voltage across two ends of a positive bus capacitor and a voltage across two ends of a negative bus capacitor. Herein, any operating periodicity is the foregoing sampling periodicity, and the operating periodicity is less than half of a periodicity corresponding to a fundamental frequency of an alternating current power grid. Based on the collected data, the controller can obtain, through calculation, related parameters of the second harmonic current that needs to be injected.

To obtain the initial phase angle θ of the second harmonic current that needs to be injected, the controller may first obtain a power factor based on the PCC voltage $u_{pcc}$ and the output current i of the power converter, that is, process $u_{pcc}$ and i by using the power factor calculation and monitoring unit to obtain the power factor. The controller may further monitor the modulation scheme of the power converter by using the modulation scheme monitoring unit, to obtain information that the modulation scheme is CPWM or DPWM. Then, the controller may obtain the corresponding initial phase angle θ based on the calculation unit for the initial phase angle of the injected second harmonic current and the information about the power factor and the modulation scheme of the power converter.

In addition, to obtain a current amplitude and a frequency of the second harmonic current that needs to be injected, the controller may process the PCC voltage $u_{pcc}$ by using a phase-locked loop PLL to obtain a PCC fundamental voltage frequency ω, and obtain the frequency of the second harmonic current based on the PCC fundamental voltage frequency ω. The controller may further process the half-bus voltage difference $u_{cp}-u_{cn}$ by using a low-pass filter (LPF) and a proportional integral (PI) regulator, to obtain the current amplitude $i_{2m}$ of the second harmonic current. As shown in FIG. 4, a reference voltage $u_{ref}$ may be first subtracted from the half-bus voltage difference $u_{cp}-u_{cn}$. Then, the half-bus voltage difference $u_{cp}-u_{cn}$ is processed by using the low-pass filter LPF and the proportional integral (PI) regulator, to obtain the current amplitude of the second harmonic current. Herein, the reference voltage $u_{ref}$ may be 0, which represents a voltage difference between the voltage across the two ends of the positive bus capacitor and the voltage across the two ends of the negative bus capacitor when the voltage across the two ends of the positive bus capacitor is equal to the voltage across the two ends of the negative bus capacitor.

In the foregoing manner, the parameters including the initial phase angle, the current amplitude, the frequency, and the like of the second harmonic current that needs to be injected are obtained, so that the second harmonic current that needs to be injected can be obtained through calculation. In FIG. 4, signals of the second harmonic current may be represented by signals $i_{2d}$ and $i_{2q}$ in a dq rotating coordinate system. Further, a modulated wave may be obtained by controlling the signals $i_{2d}$ and $i_{2q}$ by using a current loop controller, and the modulated wave is the foregoing double frequency modulated voltage signal. The foregoing general modulated signal may be obtained by superposing the double frequency modulated voltage signal and an initial modulated signal. Switching transistors in the power converter are controlled, by using the general modulated signal, to be turned on or turned off, so that potential balance of a neutral point can be implemented.

The following describes a principle of balancing a neutral point of the power converter by injecting the second harmonic current whose initial phase angle, modulation scheme, and power factor satisfy a specific relationship.

Because the power converter is a three-phase three-level topology, a bridge arm in each phase has three states: P, N, and 0. A bridge arm switching function is defined as follows:

$$S_x = \begin{cases} 1 \\ 0 \\ -1 \end{cases}, x = a, b, c \tag{1}$$

a, b, and c separately represent one of three phases of the power converter.

Figure 5:
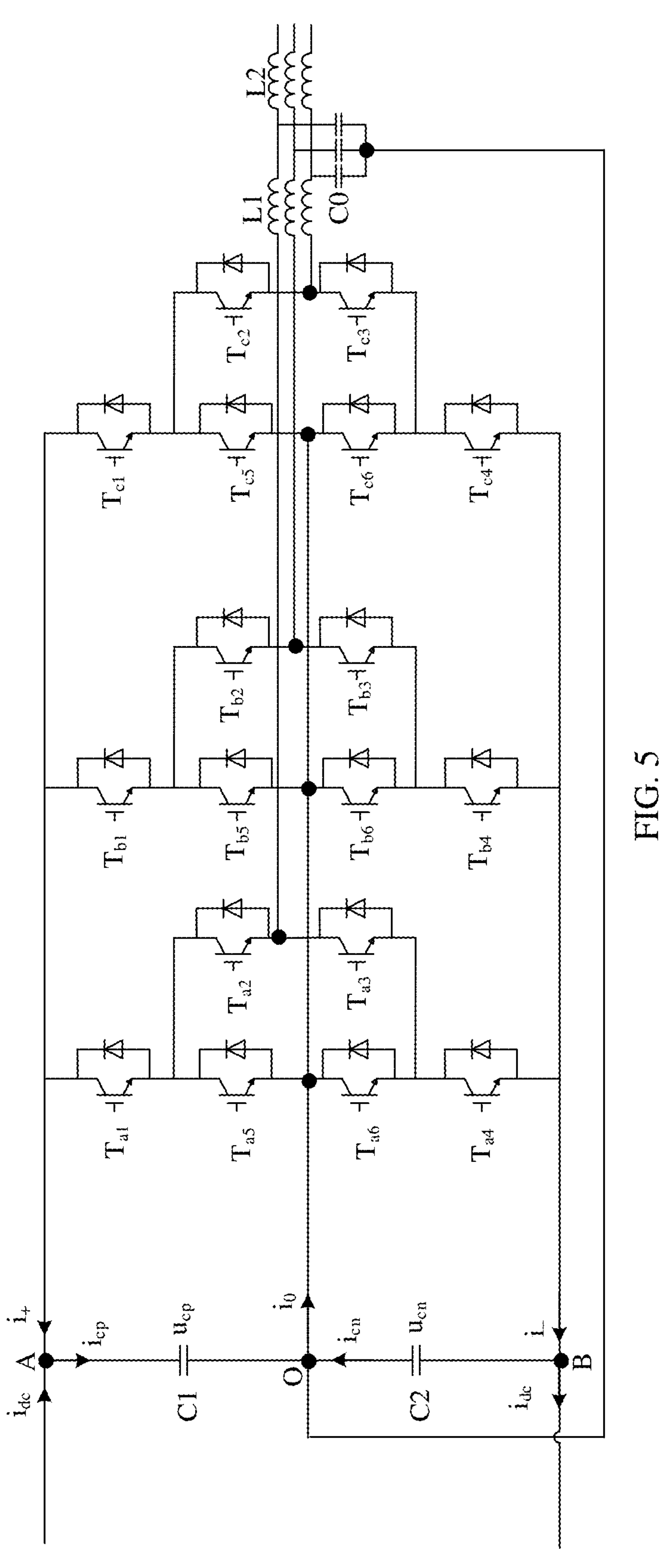
FIG. 5 is a schematic of a current flow direction of a power converter according to the embodiments.

As shown in FIG. 5, a connection point of the positive bus capacitor on a direct current side and a direct current bus is a point A, a connection point of the negative bus capacitor on the direct current side and the direct current bus is a point B, and the neutral point between the positive bus capacitor and the negative bus capacitor is a point O. When output of a bridge arm in one of the three phases is in the P state, an alternating current-side current of the phase flows into $i_+$. When output of a bridge arm in one of the three phases is in the N state, an alternating current-side current of the phase flows into $i_-$. When output of a bridge arm in one of the three phases is in the 0 state, an alternating current-side current of the phase flows into $i_0$. $i_+$ and $i_-$ may be respectively represented as follows:

$$i_+ = -\sum_{x=a,b,c}\left(\frac{|S_x| + S_x}{2}\right)i_x \tag{2}$$

$$i_- = -\sum_{x=a,b,c}\left(\frac{|S_x| - S_x}{2}\right)i_x \tag{3}$$

$i_x$ represents an alternating current-side current of an x phase (x=a, b, c) in a three-level conversion circuit. $i_+$ represents a sum of currents that are of alternating current-side currents in the three phases and that flow into the point A, and $i_-$ represents a sum of currents that are of the alternating current-side currents in the three phases and that flow into the point B.

When a dynamic behavior of switching frequency is not considered, and averaging processing is performed on a switching periodicity to continuously convert the switching function into a duty cycle d, $i_+$ and $i_-$ may be respectively represented as follows:

$$i_+ = -\left(\frac{|d_a| + d_a}{2}i_a + \frac{|d_b| + d_b}{2}i_b + \frac{|d_c| + d_c}{2}i_c\right) \tag{4}$$

$$i_- = -\left(\frac{|d_a| - d_a}{2}i_a + \frac{|d_b| - d_b}{2}i_b + \frac{|d_c| - d_c}{2}i_c\right) \tag{5}$$

$d_a$, $d_b$, and $d_c$ may respectively represent duty cycles of the phase a, the phase b, and the phase c.

Voltage dynamic equations of the positive bus capacitor and the negative bus capacitor on the direct current side are as follows:

$$C\frac{du_{cp}}{dt} = i_{cp} = i_{dc} - i_+ = i_{dc} - \left(\frac{|d_a| + d_a}{2}i_a + \frac{|d_b| + d_b}{2}i_b + \frac{|d_c| + d_c}{2}i_c\right) \tag{6}$$

$$C\frac{du_{cn}}{dt} = -i_{cn} = i_{dc} - i_- = i_{dc} + \left(\frac{|d_a| - d_a}{2}i_a + \frac{|d_b| - d_b}{2}i_b + \frac{|d_c| - d_c}{2}i_c\right) \tag{7}$$

$u_{cp}$ and $u_{cn}$ respectively represent the voltage across the two ends of the positive bus capacitor and the voltage across the two ends of the negative bus capacitor in the power converter. C represents capacitance values of the positive bus capacitor and the negative bus capacitor. $i_{dc}$ represents a current of the direct current bus.

Formula (7) is subtracted from Formula (6), and the following may be further obtained:

$$C\frac{du_{c\Delta}}{dt} = C\frac{d(u_{cp} - u_{cn})}{dt} = i_+ + i_- = i_0 = -|d_a|i_a - |d_b|i_b - |d_c|i_c \tag{8}$$

$u_{c\Delta}$ represents the difference between the voltage across the two ends of the positive bus capacitor and the voltage across the two ends of the negative bus capacitor. $i_0$ represents a sum of currents that are of the alternating current-side currents in the three phases and that flow into the point O.

When injection of the second harmonic current is considered, the duty cycle may be represented as follows:

$$\begin{cases} d_a = m\cos(\omega t) + m_2\cos(-2\omega t + \psi) + v_{com} \\ d_b = m\cos\left(\omega t - \frac{2}{3}\pi\right) + m_2\cos\left(-2\omega t + \psi - \frac{2}{3}\pi\right) + v_{com} \\ d_c = m\cos\left(\omega t + \frac{2}{3}\pi\right) + m_2\cos\left(-2\omega t + \psi + \frac{2}{3}\pi\right) + v_{com} \end{cases} \tag{9}$$

m represents a modulation ratio of a fundamental wave. $m_2$ represents a modulation ratio of a double frequency component in the modulated wave. $\psi$ represents an initial phase angle of the double frequency component in the modulated wave. $v_{com}$ represents a common modulus.

After the second harmonic current is injected, an output current of each phase is as follows:

$$\begin{cases} i_a = i_m\cos(\omega t - \phi) + i_{2m}\cos(-2\omega t + \theta) \\ i_b = i_m\cos\left(\omega t - \frac{2}{3}\pi - \phi\right) + i_{2m}\cos\left(-2\omega t - \frac{2}{3}\pi + \theta\right) \\ i_c = i_m\cos\left(\omega t + \frac{2}{3}\pi - \phi\right) + i_{2m}\cos\left(-2\omega t + \frac{2}{3}\pi + \theta\right) \end{cases} \tag{10}$$

$i_m$ represents a current amplitude of the fundamental wave. $i_{2m}$ represents the current amplitude of a second harmonic current. $\phi$ represents the power factor of the three-level converter circuit. $\theta$ represents the initial phase angle of the injected second harmonic current.

Formula (8), Formula (9), and Formula (10) are combined, and the following may be obtained:

$$\begin{aligned} C\frac{du_{c\Delta}}{dt} &= C\frac{d(u_{cp} - u_{cn})}{dt} = i_+ + i_- = \\ i_0 &= -|d_a|i_a - |d_b|i_b - |d_c|i_c = -|m\cos(\omega t) + m_2\cos(-2\omega t + \psi) + v_{com}| \\ &\left(i_m\cos\left(\omega t - \frac{2}{3}\pi - \phi\right) + i_{2m}\cos\left(-2\omega t - \frac{2}{3}\pi + \theta\right)\right) - \\ &\left|m\cos\left(\omega t + \frac{2}{3}\pi\right) + m_2\cos\left(-2\omega t + \psi + \frac{2}{3}\pi\right) + v_{com}\right| \\ &\left(i_m\cos\left(\omega t + \frac{2}{3}\pi - \phi\right) + i_{2m}\cos\left(-2\omega t + \frac{2}{3}\pi + \theta\right)\right) \end{aligned} \tag{11}$$

In consideration of symmetry of the three phases, integration is performed on Formula (11) in a power frequency periodicity, and the following may be obtained:

$$\begin{aligned} \int_t^{t+T} C\frac{du_{c\Delta}}{dt}dt &= \\ \int_t^{t+T} i_0 dt &= \int_t^{t+T} -3|m\cos(\omega t) + m_2\cos(-2\omega t + \psi) + v_{com} \\ &|(i_m\cos(\omega t - \phi) + i_{2m}\cos(-2\omega t + \theta))dt \end{aligned} \tag{12}$$

T is a power frequency periodicity. A value of Formula (12) is defined as a potential balance adjustment amount of the neutral point.

It can be seen from Formula (12) that, factors that affect potential balance of the neutral point of the positive bus capacitor and the negative bus capacitor include: the modulation scheme (different modulation schemes lead to different common moduli $v_{com}$), the power factor $\phi$, the initial phase angle $\theta$ of the injected second harmonic current, and the initial phase angle $\psi$ of the double frequency component in the modulated wave (a value of the initial phase angle of the double frequency component in the modulated wave depends on power grid strength and the initial phase angle $\theta$ of the second harmonic current).

Analytical analysis of Formula (12) is excessively complex. The analytical analysis is very difficult, for example, when the converter adopts DPWM modulation. Therefore, a calculation environment such as MATLAB may be used to perform numerical calculation and analysis on Formula (12). The following results may be obtained through a large amount of numerical calculation and analysis.

When the modulation scheme of the converter is discontinuous pulse width modulation (DPWM), the initial phase angle of the second harmonic current that needs to be injected and the power factor satisfy the foregoing relationship (1). The initial phase angle θ may be any value within a range to which the initial phase angle belongs.

When the modulation scheme of the converter is continuous pulse width modulation (CPWM), the initial phase angle of the second harmonic current that needs to be injected and the power factor satisfy the foregoing relationship (2). The initial phase angle θ may be any value within a range to which the initial phase angle belongs.

The following explains the foregoing result with reference to a specific instance.

Figure 6:
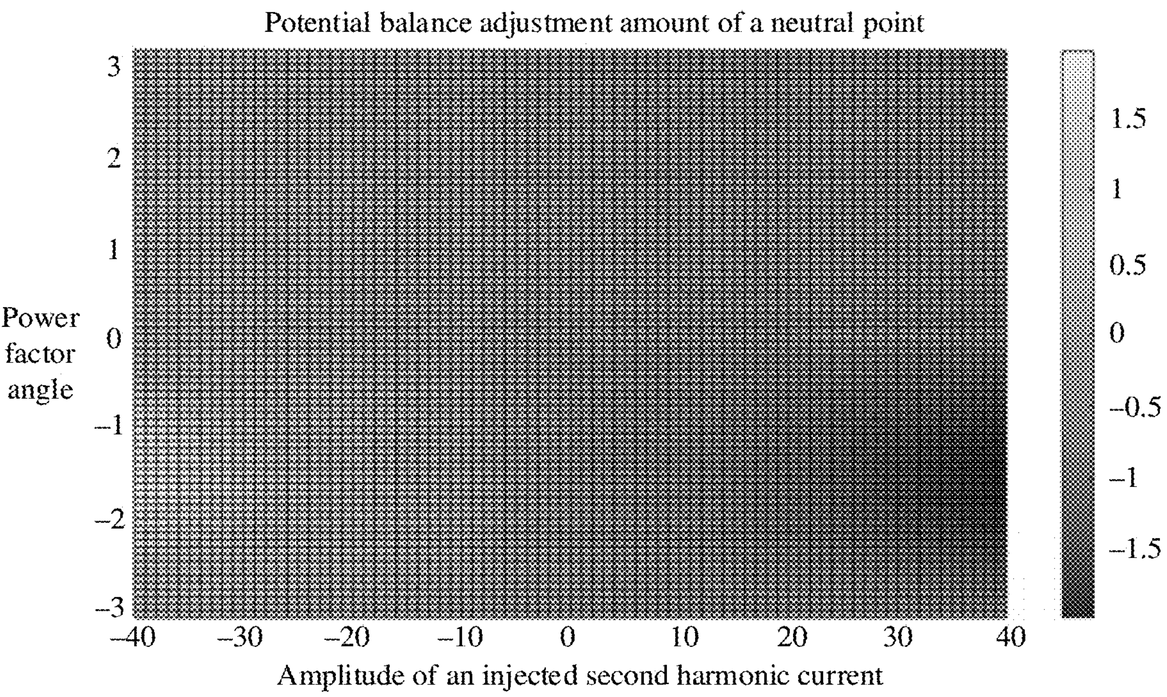
FIG. 6 is a diagram of a three-dimensional relationship between a potential balance adjustment amount of a neutral point and an amplitude of an injected second harmonic current and a power factor according to the embodiments.
Figure 7:
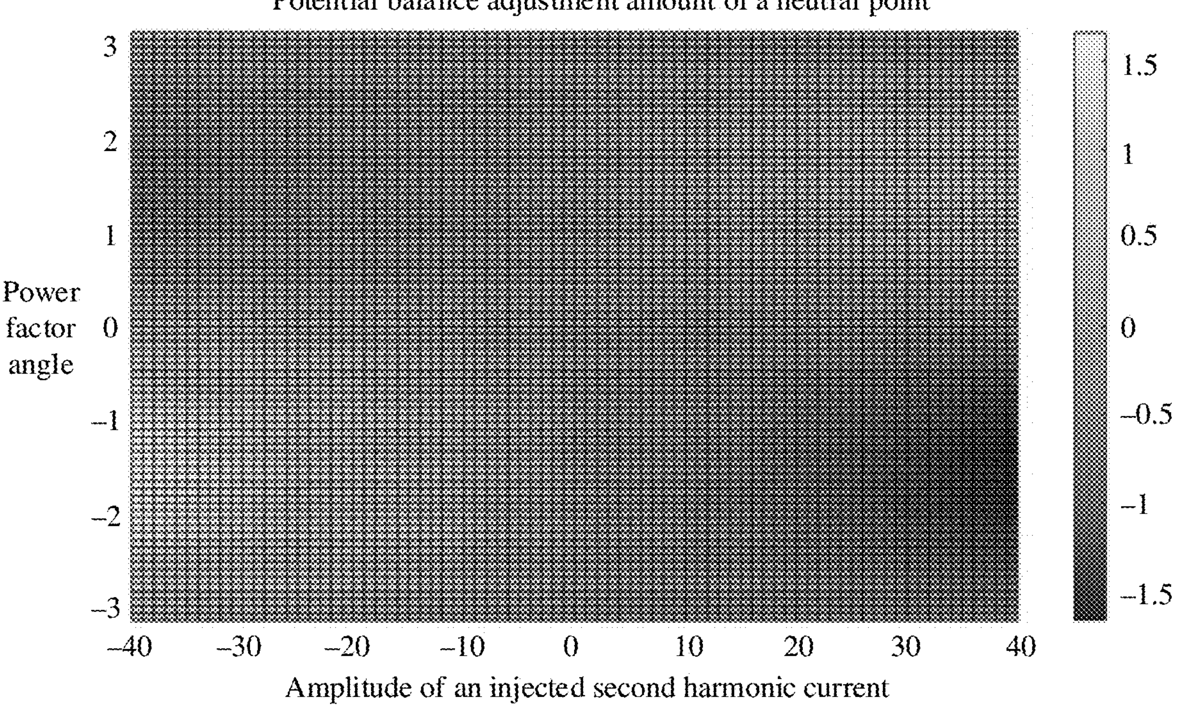
FIG. 7 is another diagram of a three-dimensional relationship between a potential balance adjustment amount of a neutral point and an amplitude of an injected second harmonic current and a power factor according to the embodiments.

In an extremely weak power grid operating condition, for example, a short circuit ratio (a parameter for measuring the power grid strength) is 1.5, when the modulation scheme adopted by the power converter is DPWM, if the initial phase angle θ of the second harmonic current satisfies the foregoing relationship (1), a diagram of a three-dimensional relationship between the potential balance adjustment amount of the neutral point mentioned in Formula (12) and the amplitude of the injected second harmonic current and the power factor is shown in FIG. 6. If the initial phase angle θ of the second harmonic current does not satisfy the foregoing relationship (1), a diagram of a three-dimensional relationship between the potential balance adjustment amount of the neutral point and the amplitude of the injected second harmonic current and the power factor is shown in FIG. 7. In FIG. 6 and FIG. 7, a value of the potential balance adjustment amount of the neutral point is represented by a color. A power factor angle in FIG. 6 and FIG. 7 is the power factor mentioned in the embodiments and is collectively referred to as the power factor below.

It can be understood from FIG. 6 that, when the initial phase angle of the injected second harmonic current satisfies the foregoing relationship (1), when the amplitude of the injected second harmonic current gradually changes from a negative value to a positive value, regardless of whether a value of the power factor is within a range [−π, 0] or a range [0, π], the value of the potential balance adjustment amount of the neutral point changes from a positive value to a negative value (that is, gradually transits from yellow to blue from left to right in FIG. 6) as the amplitude of the injected second harmonic current changes. In other words, a change trend that the potential balance adjustment amount of the neutral point has with the amplitude of the injected second harmonic current is determinate. The injected second harmonic current can affect, through control within all power factor ranges, a shift of a potential of the neutral point. Therefore, the shift of the potential of the neutral point can be gradually reduced under control until balance is achieved, to reduce the difference between the voltage across the two ends of the positive bus capacitor and the voltage across the two ends of the negative bus capacitor, and resolve a problem of potential imbalance of the neutral point. In other words, the power converter can form negative feedback control within all the power factor ranges, so that the potential of the neutral point can be balanced.

It can be understood from FIG. 7 that, when the initial phase angle of the injected second harmonic current does not satisfy the foregoing relationship (1), when the amplitude of the injected second harmonic current gradually changes from a negative value to a positive value, and when the value of the power factor is within the range [−π, 0], the value of the potential balance adjustment amount of the neutral point changes from a positive value to a negative value as the amplitude of the injected second harmonic current changes (that is, a lower part of FIG. 7 gradually transits from yellow to blue from left to right). However, when the value of the power factor is within the range [0, π], the value of the potential balance adjustment amount of the neutral point changes from a negative value to a positive value as the amplitude of the injected second harmonic current changes (that is, an upper part of FIG. 7 gradually transits from blue to yellow from left to right). Therefore, when the value of the power factor ϕ is within the range [0, π], the power converter forms a positive feedback, and consequently, the potential of the neutral point cannot be balanced.

Similarly, when the modulation scheme of the power converter is CPWM, analysis is basically the same as the foregoing analysis. That is, when the modulation scheme adopted by the power converter is CPWM, if the initial phase angle of the injected second harmonic current satisfies the foregoing relationship (2), it can be ensured that the power converter can form negative feedback control within all the power factor ranges, so that the potential of the neutral point can be balanced. If the initial phase angle of the injected second harmonic current does not satisfy the foregoing relationship (2), when the value of the power factor ϕ is within the range [0, π], the power converter forms a positive feedback, and consequently, the potential of the neutral point cannot be balanced.

In the foregoing process, the extremely weak power grid operating condition is used as an example to prove that the power converter provided in the embodiments can implement potential balance of the neutral point. This is not limited to the extremely weak power grid operating condition. In another operating condition such as a strong power grid operating condition, the power converter provided in the embodiments can still implement potential balance of the neutral point.

In the embodiments, the initial phase angle of the second harmonic current is determined based on the modulation scheme and the power factor of the power converter, and the power converter is controlled to inject, into the alternating current power grid, the second harmonic current whose the initial phase angle that satisfies a specific requirement. The injected second harmonic current can affect, through control, the shift of the neutral point when the power factor changes, so that the power converter can form negative feedback control within all the power factor ranges, to reduce the difference between the voltage across the two ends of the positive bus capacitor and the voltage across the two ends of the negative bus capacitor, resolve the problem of potential imbalance of the neutral point, and improve reliability and stability of the power converter. Control of potential balance of the neutral point of the power converter can be implemented under various power grid operating conditions such as a strong power grid and a weak power grid. An application scope is wide and balance effect is good.

Figure 8:
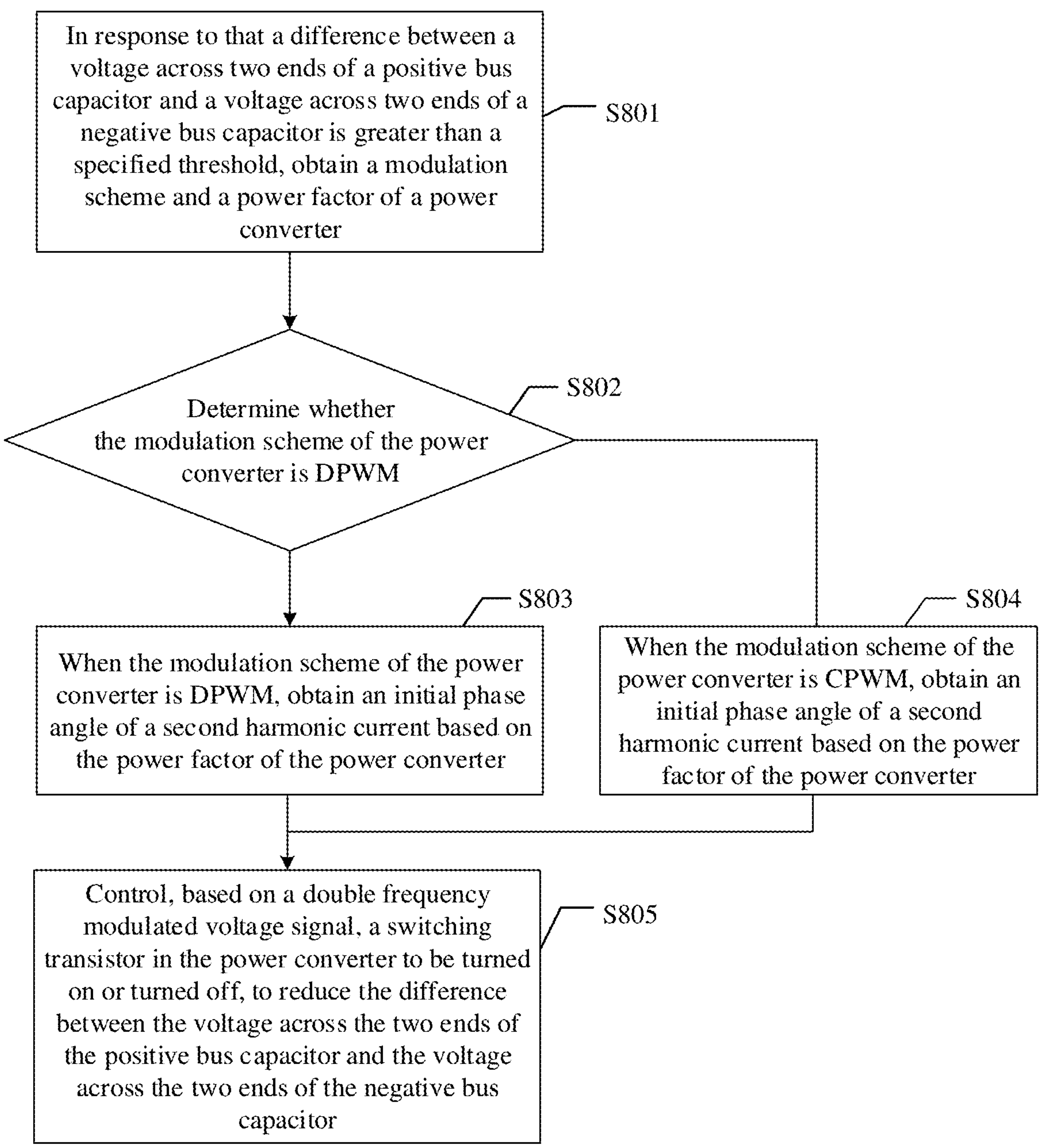
FIG. 8 is a schematic flowchart of a control method according to the embodiments.

FIG. 8 is a schematic flowchart of a control method according to the embodiments. As shown in FIG. 8, the method may include the following steps.

Step S801: In response to that a difference between a voltage across two ends of a positive bus capacitor and a voltage across two ends of a negative bus capacitor is greater than a specified threshold, obtain a modulation scheme and a power factor of a power converter.

In some implementations, the control method may be used to control potential balance of a neutral point of the power converter. When the difference between the voltage across the two ends of the positive bus capacitor and the voltage across the two ends of the negative bus capacitor is greater than the specified threshold, it indicates that a potential of the neutral point is unbalanced, and step S801 may be performed. Here, the power factor of the power converter is an average value of a plurality of power factor instantaneous value in a sampling periodicity. The sampling periodicity is less than half of a periodicity corresponding to a fundamental frequency of an alternating current power grid. The power factor instantaneous value may be obtained based on a PCC voltage and an output current of the power converter. The modulation scheme of the power converter may include DPWM and CPWM. It is understandable that the modulation scheme is a modulation scheme of the power converter in the sampling periodicity.

Step S802: Determine whether the modulation scheme of the power converter is DPWM.

If the modulation scheme of the power converter is DPWM, step S803 is performed. If the modulation scheme of the power converter is not DPWM, step S804 is performed.

Step S803: When the modulation scheme of the power converter is DPWM, obtain an initial phase angle of a second harmonic current based on the power factor of the power converter.

In this case, the initial phase angle and the power factor satisfy the foregoing relationship (1). Details are not described herein again.

The DPWM scheme may include modulation schemes such as DPWM 0, DPWM 1, and DPWM 2.

Step S804: When the modulation scheme of the power converter is CPWM, obtain an initial phase angle of a second harmonic current based on the power factor of the power converter.

In this case, the initial phase angle and the power factor satisfy the foregoing relationship (2). Details are not described herein again.

The CPWM scheme may include modulation schemes such as SPWM or SVPWM.

It may be understood that, when the initial phase angle of the second harmonic current and the modulation scheme and the power factor of the power converter satisfy the foregoing specific relationship, the power converter can form negative feedback control within all power factor ranges, so that the power converter can be controlled to inject the second harmonic current into the alternating current power grid, and the difference between the voltage across the two ends of the positive bus capacitor and the voltage across the two ends of the negative bus capacitor may be adjusted, to reduce the difference, resolve a problem of potential imbalance of the neutral point, and improve reliability and stability of the power converter. This method is applicable to various power grid operating conditions, operation is simple, and effect of potential balance of the neutral point is good.

In some implementations, proportional integral (PI) control may be further performed on a half-bus voltage difference $u_{cp}-u_{cn}$ (such as the difference between the voltage across the two ends of the positive bus capacitor and the voltage across the two ends of the negative bus capacitor), to obtain a current amplitude of the second harmonic current. It may be understood that, the power converter is subsequently controlled to inject, into the alternating current power grid, the second harmonic current whose current amplitude is the foregoing value, so that the difference between the voltage across the two ends of the positive bus capacitor and the voltage across the two ends of the negative bus capacitor can be adjusted, to balance the potential of the neutral point, improve reliability and stability of a circuit, and reduce a possibility of damage to a switch component.

In some implementations, a frequency of the second harmonic current may be further obtained based on a PCC voltage frequency. Herein, the frequency of the second harmonic current is twice a PCC fundamental voltage frequency. The PCC fundamental voltage frequency may be obtained by using a phase-locked loop or in another manner. In this way, the frequency of the second harmonic current that needs to be injected may be obtained based on the PCC voltage, to obtain, through calculation, the second harmonic current that needs to be injected. This helps implement potential balance of the neutral point of the power converter, and improve reliability and stability of the circuit.

Step S805: Control, based on a double frequency modulated voltage signal, a switching transistor in the power converter to be turned on or turned off, to reduce the difference between the voltage across the two ends of the positive bus capacitor and the voltage across the two ends of the negative bus capacitor.

The double frequency modulated voltage signal is obtained by performing proportional integral (PI) control on the second harmonic current.

In the embodiments, the initial phase angle of the second harmonic current is determined based on the modulation scheme and the power factor of the power converter, and the power converter is controlled to inject, into the alternating current power grid, the second harmonic current whose the initial phase angle that satisfies a specific requirement. The injected second harmonic current can affect, through control, the shift of the neutral point when the power factor changes, so that the power converter can form negative feedback control within all the power factor ranges, to reduce the difference between the voltage across the two ends of the positive bus capacitor and the voltage across the two ends of the negative bus capacitor, and resolve the problem of potential imbalance of the neutral point. In addition, the control method can be applicable to a strong power grid operating condition and a weak power grid operating condition, can enable stable and reliable operation of the power converter in various power grid operating conditions, and can improve stability and reliability of the power converter. An application scope is wide, and operation is simple.

The foregoing descriptions are merely specific implementations of the embodiments but are not intended to limit their scope. Any variation or replacement readily figured out by a person skilled in the art shall fall within the scope of the embodiments.

What is claimed is:

1. A power converter comprising:

a power conversion circuit, wherein a direct current input end of the power conversion circuit is configured to connect to a direct current power supply through a direct current bus and an alternating current output end of the power conversion circuit is configured to connect to an alternating current power grid through a point of common coupling (PCC);

a bus capacitor connected in parallel to two ends of the direct current bus, the direct current bus comprises a positive direct current bus and a negative direct current bus, the bus capacitor comprises a positive bus capacitor and a negative bus capacitor that are connected in series, a series connection point of the positive bus capacitor and the negative bus capacitor is a neutral point, the positive bus capacitor is connected in parallel between the positive direct current bus and the neutral point, and the negative bus capacitor is connected in parallel between the negative direct current bus and the neutral point; and a controller configured to:

after a difference between a voltage across two ends of the positive bus capacitor and a voltage across two ends of the negative bus capacitor is greater than a specified threshold, control the power converter to inject a second harmonic current into the alternating current power grid, to reduce the difference between the voltage across the two ends of the positive bus capacitor and the voltage across the two ends of the negative bus capacitor, wherein a frequency of the second harmonic current is twice a fundamental frequency of the alternating current power grid, an initial phase angle of the second harmonic current is within a preset interval, the preset interval comprises [−π/4, −π/2], [π/4, π/2], [−π/2, π/2], [ϕ, π/2], [−π/2, ϕ−π], and [−π/2, π/2], ϕ is a power factor of the power converter, and the power factor is a phase difference between an output voltage and an output current of the power converter.

2. The power converter according to claim 1, wherein the initial phase angle of the second harmonic current is in any interval of [−π/4, −π/2], [π/4, π/2], [−π/2, π/2], [ϕ, π/2], [−π/2, ϕ−π], and [−π/2, π/2] based on different modulation schemes and different power factors of the power converter, wherein a value interval of the power factor comprises (0, π/2], (π/2, π], and [−π, 0].

3. The power converter according to claim 2, wherein, when the modulation scheme of the power converter is discontinuous pulse width modulation (DPWM), the initial phase angle and the power factor of the power converter satisfy at least one of the following relationships:

when the power factor ϕ∈(0, π/2], an initial phase angle θ satisfies θ∈[−π/4, −π/2]; or when the power factor ϕ∈(π/2, π], the initial phase angle θ satisfies θ∈[π/4, π/2]; or when the power factor ϕ∈[−π, 0], the initial phase angle θ satisfies θ∈[−π/2, π/2].

4. The power converter according to claim 2, wherein, when the modulation scheme of the power converter is continuous pulse width modulation (CPWM), the initial phase angle and the power factor of the power converter satisfy at least one of the following relationships:

when the power factor ϕ∈(0, π/2], an initial phase angle θ satisfies θ∈[ϕ, π/2]; or when the power factor ϕ∈(π/2, π], the initial phase angle θ satisfies θ∈[−π/2, ϕ−π]; or when the power factor ϕ∈[−π, 0], the initial phase angle θ satisfies θ∈[−π/2, π/2].

5. The power converter according to claim 3, wherein the power factor is an average value of a plurality of power factor instantaneous values, the plurality of power factor instantaneous values is obtained in a sampling periodicity, each of the plurality of power factor instantaneous values is obtained based on a voltage of the PCC and the output current of the power converter, and the sampling periodicity is less than half of a periodicity corresponding to the fundamental frequency of the alternating current power grid.

6. The power converter according to claim 4, wherein the power factor is an average value of a plurality of power factor instantaneous values, the plurality of power factor instantaneous values is obtained in a sampling periodicity, each of the plurality of power factor instantaneous values is obtained based on a voltage of the PCC and the output current of the power converter, and the sampling periodicity is less than half of a periodicity corresponding to the fundamental frequency of the alternating current power grid.

7. The power converter according to claim 5, wherein the controller is further configured to:

control, based on a double frequency modulated voltage signal, a switching transistor in the power converter to control injection by the power converter of the second harmonic current into the alternating current power grid, and obtain the double frequency modulated voltage signal by performing proportional integral (PI) control on the second harmonic current.

8. The power converter according to claim 6, wherein the controller is further configured to:

control, based on a double frequency modulated voltage signal, a switching transistor in the power converter to be turned on or turned off, to control injection by the power converter of the second harmonic current into the alternating current power grid, and obtain the double frequency modulated voltage signal by performing proportional integral (PI) control on the second harmonic current.

9. The power converter according to claim 7, wherein the controller is further configured to:

obtain a current amplitude of the second harmonic current by performing proportional integral (PI) control on a half-bus voltage difference, wherein the half-bus voltage difference is the difference between the voltage across the two ends of the positive bus capacitor and the voltage across the two ends of the negative bus capacitor.

10. The power converter according to claim 8, wherein the controller is further configured to:

obtain a current amplitude of the second harmonic current by performing the proportional integral (PI) control on a half-bus voltage difference, wherein the half-bus voltage difference is the difference between the voltage across the two ends of the positive bus capacitor and the voltage across the two ends of the negative bus capacitor.

11. An energy storage system, comprising:

an energy storage battery; and a power converter comprising:

a power conversion circuit, wherein a direct current input end of the power conversion circuit is configured to connect to the energy storage battery through a direct current bus, an alternating current output end of the power conversion circuit is configured to connect to an alternating current power grid through a point of common coupling (PCC);

a bus capacitor connected in parallel to two ends of the direct current bus, wherein the direct current bus comprises a positive direct current bus and a negative direct current bus, the bus capacitor comprises a positive bus capacitor and a negative bus capacitor that are connected in series, a series connection point of the positive bus capacitor and the negative bus capacitor is a neutral point, the positive bus capacitor is connected in parallel between the positive direct current bus and the neutral point, and the negative bus capacitor is connected in parallel between the negative direct current bus and the neutral point; and a controller configured to:

after a difference between a voltage across two ends of the positive bus capacitor and a voltage across two ends of the negative bus capacitor is greater than a specified threshold, control the power converter to inject a second harmonic current into the alternating current power grid, to reduce the difference between the voltage across the two ends of the positive bus capacitor and the voltage across the two ends of the negative bus capacitor, wherein a frequency of the second harmonic current is twice a fundamental frequency of the alternating current power grid, an initial phase angle of the second harmonic current is within a preset interval, the preset interval comprises [$-\pi/4$, $-\pi/2$], [$\pi/4$, $\pi/2$], [$-\pi/2$, $\pi/2$], [$\phi$, $\pi/2$], [$-\pi/2$, $\phi-\pi$], and [$-\pi/2$, $\pi/2$], $\phi$ is a power factor of the power converter, and the power factor is a phase difference between an output voltage and an output current of the power converter.

12. A method comprising:

after a difference between a voltage across two ends of a positive bus capacitor and a voltage across two ends of a negative bus capacitor is greater than a specified threshold, controlling a power converter to inject a second harmonic current into an alternating current power grid, to reduce the difference between the voltage across the two ends of the positive bus capacitor and the voltage across the two ends of the negative bus capacitor, wherein a frequency of the second harmonic current is twice a fundamental frequency of the alternating current power grid, an initial phase angle of the second harmonic current is within a preset interval, the preset interval comprises [$-\pi/4$, $-\pi/2$], [$\pi/4$, $\pi/2$], [$-\pi/2$, $\pi/2$], [$\phi$, $\pi/2$], [$-\pi/2$, $\phi-\pi$], and [$-\pi/2$, $\pi/2$], $\phi$ is a power factor of the power converter, and the power factor is a phase difference between an output voltage and an output current of the power converter.

13. The method according to claim 12, wherein the initial phase angle of the second harmonic current is in any interval of [$-\pi/4$, $-\pi/2$], [$\pi/4$, $\pi/2$], [$-\pi/2$, $\pi/2$], [$\phi$, $\pi/2$], [$-\pi/2$, $\phi-\pi$], and [$-\pi/2$, $\pi/2$] based on different modulation schemes and different power factors of the power converter, wherein a value interval of the power factor comprises ($0$, $\pi/2$], ($\pi/2$, $\pi$], and [$-\pi$, $0$].

14. The method according to claim 13, further comprising:

when the modulation scheme of the power converter is discontinuous pulse width modulation (DPWM), the initial phase angle and the power factor of the power converter satisfy at least one of the following relationships:

when the power factor $\phi \in (0, \pi/2]$, an initial phase angle $\theta$ satisfies $\theta \in [-\pi/4, -\pi/2]$; or when the power factor $\phi \in (\pi/2, \pi]$, the initial phase angle $\theta$ satisfies $\theta \in [\pi/4, \pi/2]$; or when the power factor $\phi \in [-\pi, 0]$, the initial phase angle $\theta$ satisfies $\theta \in [-\pi/2, \pi/2]$.

15. The method according to claim 13, further comprising:

when the modulation scheme of the power converter is continuous pulse width modulation (CPWM), the initial phase angle and the power factor of the power converter satisfy at least one of the following relationships:

when the power factor $\phi \in (0, \pi/2]$, an initial phase angle $\theta$ satisfies $\theta \in [\phi, \pi/2]$; or when the power factor $\phi \in (\pi/2, \pi]$, the initial phase angle $\theta$ satisfies $\theta \in [-\pi/2, \phi-\pi]$; or when the power factor $\phi \in [-\pi, 0]$, the initial phase angle $\theta$ satisfies $\theta \in [-\pi/2, \pi/2]$.

16. The method according to claim 14, wherein the power factor is an average value of a plurality of power factor instantaneous values, the plurality of power factor instantaneous values is obtained in a sampling periodicity, each of the plurality of power factor instantaneous values is obtained based on voltage of the PCC and the output current of the power converter, and the sampling periodicity is less than half of a periodicity corresponding to the fundamental frequency of the alternating current power grid.

17. The method according to claim 15, wherein the power factor is an average value of a plurality of power factor instantaneous values, the plurality of power factor instantaneous values is obtained in a sampling periodicity, each of the plurality of power factor instantaneous values is obtained based on voltage of the PCC and the output current of the power converter, and the sampling periodicity is less than half of a periodicity corresponding to the fundamental frequency of the alternating current power grid.

18. The method according to claim 16, further comprising:

controlling, based on a double frequency modulated voltage signal, a switching transistor in the power converter to control injection by the power converter of the second harmonic current into the alternating current power grid; and obtaining the double frequency modulated voltage signal by performing proportional integral (PI) control on the second harmonic current.

19. The method according to claim 17, further comprising:

controlling, based on a double frequency modulated voltage signal, a switching transistor in the power converter to control injection by the power converter of the second harmonic current into the alternating current power grid; and obtaining the double frequency modulated voltage signal by performing proportional integral (PI) control on the second harmonic current.

20. The method according to claim 19, further comprising: obtaining a current amplitude of the second harmonic current by performing the proportional integral (PI) control on a half-bus voltage difference, wherein the half-bus voltage difference is the difference between the voltage across the two ends of the positive bus capacitor and the voltage across the two ends of the negative bus capacitor.

* * * * *